3,434,359
BRAKE ACTUATOR ASSEMBLY
William J. Williams, Ashtabula, and Donald A. Ray, Jefferson, Ohio, assignors, by mesne assignments, to Rockwell-Standard Company, Pittsburgh, Pa., a corporation of Delaware
Filed June 14, 1966, Ser. No. 557,562
Int. Cl. F16h 25/18, 21/44; B60t 11/10
U.S. Cl. 74—110                    10 Claims

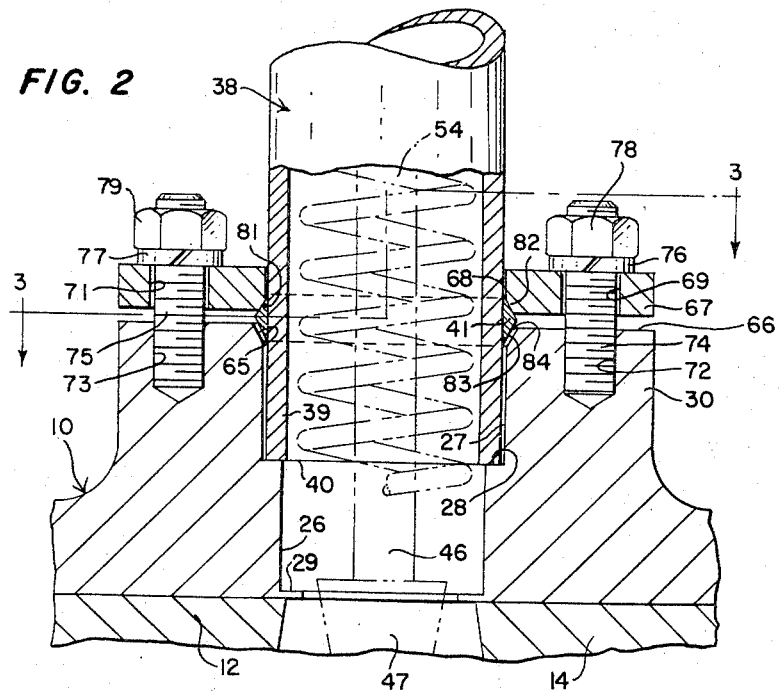
FIG. 2
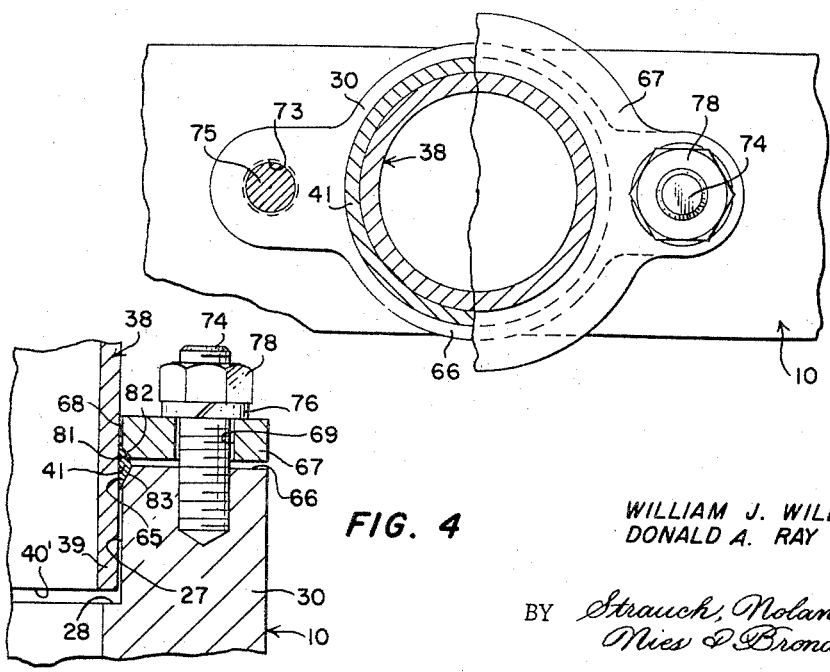
FIG. 3
FIG. 4
INVENTORS
WILLIAM J. WILLIAMS
DONALD A. RAY
BY Strauch, Nolan, Neale,
Mies & Bronaugh
ATTORNEYS United States Patent Office 3,434,359
Patented Mar. 25, 1969

ABSTRACT OF THE DISCLOSURE

A brake assembly wherein a reciprocable wedge actuator projects into an actuator housing containing two oppositely slidable brake shoe associated plungers disposed in aligned bores having a common axis and a fluid pressure motor unit has a tubular support by which it is mounted on the housing with the wedge actuator extending between a fluid pressure responsive element of said motor and the inner ends of said plungers, the housing having a bore into which the support extends, an axially fixed axially outwardly facing abutment in the housing bore accurately located a predetermined distance from said plunger axis, a cooperating axially fixed axially inwardly facing abutment on said support having an accurately predetermined location relative to a limit stroke position of said motor, and retainer means for forcing said motor unit and actuator housing together to engage and maintain engagement of said abutments while permitting rotation of the motor unit about its axis without changing the axial location of the parts determined by said abutments.

---

The present invention refers to a vehicle wheel brake actuator assembly and more in particular to special mounting of a fluid pressure motor on an actuator housing.

The invention herein comprises a novel manner of securing the tubular support of a motor unit to the brake actuator housing in an axially predetermined position so that the cooperating brake shoe actuating components contained within the actuator housing and the motor will be autmoatically assembled in correct relative position to assure and maintain maximum brake performance.

The problem solved by the invention has long been inherent in wedge actuated brakes of the types disclosed in U.S. Patents Nos. 2,527,126 and 3,037,584. In such brakes it is extremely difficult to properly assemble the fluid pressure responsive motor with the actuator housing so that the motor and all of the parts of the brake actuating mechanism will be correctly positioned and maintained in that position. A simple threaded connection between the motor support and the actuator housing has been found to be unsatisfactory and the addition of a locknut did not solve the problem. In these patented and other prior wedge actuator brakes, it has always been necessary to provide auxiliary locating devices such as shims and adjustments, and to make accurate measurements during assembly, usually requiring skilled labor both in initial assembly and in later adjustments.

Considerable improvement over these patented constructions has been made as disclosed in the pending application of Frank T. Cox, Ser. No. 536,384 filed Mar. 22, 1966 now matured into U.S. Letters Patent No. 3,395,584 issued Aug. 6, 1968 wherein the tubular motor support and the actuator housing are provided with axially located cooperating faces which axially position the actuating components properly upon assembly, and the present invention constitutes further improvement over that arrangement by providing a construction wherein the properly axially located motor unit may also be rotatably adjusted into position to clear brake line and spring connections and otherwise adapt the mounted brake assembly in optimum fashion to the space requirements of a particular axle, without changing the preset axial location of the motor unit on the actuator housing.

More particularly the invention provides improved attachment of the tubular fluid pressure motor support to the brake actuator housing which properly axially locates the operating parts but allows the tubular support to be rotated after the axial position has been fixed, to for example accommodate different positions of the fluid pressure motor air or hydraulic line connections without altering the established relative positions of the internal brake actuating mechanism components, and this is the major object of the invention.

A further object of the invention is to provide novel mounting of a fluid pressure responsive motor unit on a brake shoe actuator housing which will properly axially and otherwise locate and preset an operative element of the motor unit such as a reciprocable wedge, relative to brake shoe displacement elements, such as plungers in the housing, and yet permit rotation of the motor unit to suit space and connection requirements without changing that preset arrangement. Pursuant to that object the invention more specifically contemplates novel cooperative formations on the motor unit support tube and the housing providing location faces in predetermined relation. More specifically it is an object of the invention to provide axially fixed abutting smooth relatively rotatable faces at said formations.

The invention will become further understood from the following detailed description in connection with the appended drawings which illustrates several forms of suitable embodiments and in which:

FIGURE 2 is an enlarged fragmentary view in section further showing the mounting of the motor unit on the actuator housing;

FIGURE 3 is a section through FIGURE 2 substantially along line 3—3;

FIGURE 4 is a fragmentary view in section showing a motor mounting similar to FIGURE 1 but according to another embodiment of the invention;

Figure 1:
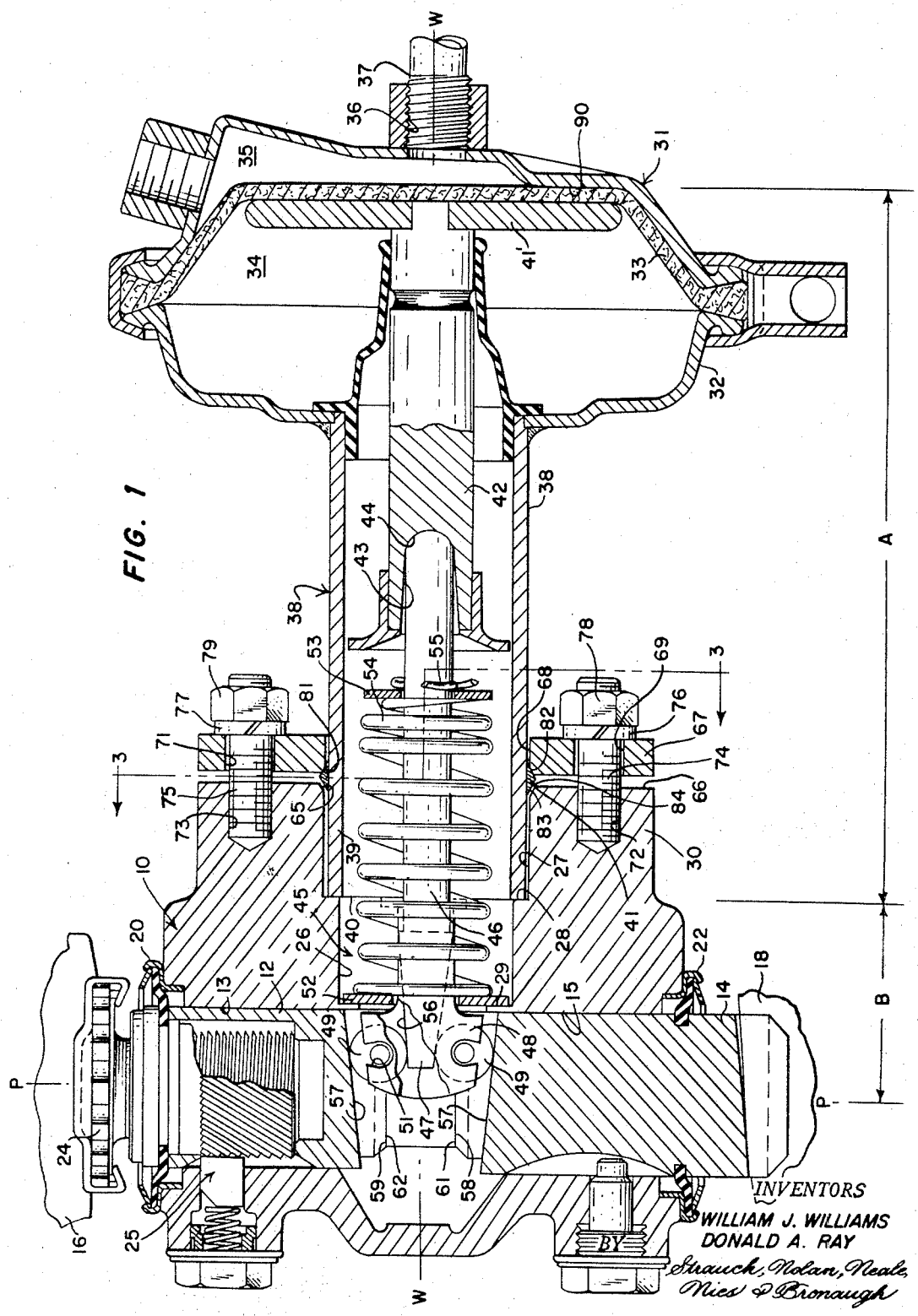
FIGURE 1 is an assembly view mainly in section showing a fluid pressure motor unit mounted on a brake actuator housing in accord with a preferred embodiment of the invention.

FIGURE 1 shows a wedge brake actuator unit for a vehicle wheel wherein the invention is embodied. An actuator housing 10 is preferably integral with or rigidly attached to a conventional brake spider or support (not shown) mounted on the vehicle axle. Actuator housing 10 contains oppositely disposed co-axial plungers 12 and 14 non-rotatably slidable in bores 13 and 15 and operatively connected at their outer ends to the opposite ends of brake shoes indicated at 16 and 18 respectively. Where the plungers project from housing 10, suitable seals 20 and 22 are provided to prevent the entrance of foreign matter into the housing and to retain the lubricant contained therein.

One or both plungers 12 and 14 may be longitudinally adjustable either manually or automatically to compensate for lining wear on the brake shoes 16 and 18. A rotatable star wreel 24 is shown associated with plunger 12 for manual adjustment of the effective length of the plunger. An automatic adjustment for the purpose is shown at 25. These adjustments are preferably the same as disclosed in U.S. Letters Patent No. 3,068,964 issued Dec. 18, 1962.

In general, the mounting of housing 10 on its spider is much the same as disclosed in said U.S. Letters Patent No. 3,037,584 issued June 5, 1962 to which reference is made for necessary further detail.

Housing 10 is formed with a side opening comprising an inner cylindrical bore 26 and a coaxial outer larger diameter cylindrical bore 27, there being a flat smooth annular axially outwardly facing shoulder 28 at the bottom of bore 27. At the inner end of bore 26, opposed projections form diametrically opposite shoulder means at 29 within the opening for a purpose to appear. As shown, bore 26 preferably lies within the actuator housing body while bore 27 is disposed within a projecting hollow boss 30. The common axis of bores 26 and 27 indicated at W—W is at right angles to the common axes of the plunger bores P—P. Shoulders 28 and 29 lie in parallel planes at right angles to axis W—W.

A fluid pressure motor assembly 31 is composed of a multipart sheet metal casing 32 within which is peripherally clamped a flexible diaphragm 33 that defines fluid pressure chambers 34 and 35 at opposite sides thereof. The wall of casing 32 is formed with a threaded aperture 36 for connection of chamber 35 to a fluid pressure supply line 37 leading to the usual air pressure reservoir.

Casing 32 is provided with a rigid hollow mounting tube 38 which is cylindrical at least at its end region indicated at 39 so as to extend with substantial radial clearance into housing bore 27, and terminating in a flat smooth annular end face 40 abutting housing shoulder 28 in a plane perpendicular to axis W—W. An annular ring 41 of special characteristics as will appear is rigidly secured around the exterior of tube 38, either as by welding or by integral formation.

Abutting the center of diaphragm 33 is a rigid disc 41' to which is secured one end of a rod 42 that has its other end formed with a socket 43 having a spherical contour bottom 44.

A wedge assembly cartridge 45 consists essentially of a rod 46 having an integral wedge 47, a floating roller carrier 48, rollers 49 mounted in carrier slots 51, axially spaced washers 52 and 53 with a compression spring 54 between them surrounding the wedge and rod, and a fastener such as cotter key 55 extending through rod 46 adjacent washer 53; and this wedge assembly comprises a motion transmitting unit interposed between the motor diaphragm and the actuator plungers.

As shown in FIGURE 1, in the assembly the end of rod 46 opposite wedge 47 is formed to seat in recess 43, and rollers 49 are disposed to extend between the opposite inclined sides 56 of wedge 47 and similarly inclined plungers inner end slot surfaces 57. Surfaces 57 lie at the bottom of plunger end slots wide enough to receive the rollers.

Interiorly, housing 10 is formed with parallel anchor faces 58 and 59 which are adapted to be abutted by the plunger inner ends 61 and 62 respectively during normal operation, depending upon the direction of movement of the vehicle when the brake is applied.

In the assembly of FIGURE 1, washer 52 of the wedge unit seats on body shoulder 29, and preferably washer 52 is non-rotatable with respect to bore 26 and has a rectangular wedge passing and guiding aperture, to assure that the wedge 47 and rollers 49 are properly oriented with respect to the inner ends of plungers 12 and 14.

Washer 52 and its non-rotatable mounting in bore 26 and its cooperation with the wedge may be the same as disclosed in copending Ser. No. 368,903 filed May 20, 1964 now matured into U.S. Letters Patent No. 3,302,473 issued Feb. 7, 1967. The structure and cooperation of the wedge, the floating carrier 48, the roller 49 and the inner ends of the plungers is preferably the same as disclosed in said Letters Patent No. 3,037,584.

The outer end of bore 27 is formed with an internal chamfer providing an annular inclined generally conical smooth face 65 coaxial with axis W—W. The end 66 of boss 30 is preferably flat. A retainer member 67 in the form of a rigid flat plate has a bore 68 loosely surrounding tube 38 and opposite openings 69 and 71 aligned with threaded bores 72 and 73 respectively in the end of boss 30.

Studs 74 and 75 are fixed in bores 72 and 73 and extend through plate openings 69 and 71 to receive lock washers 76 and 77 and nuts 78 and 79 respectively. When these nuts are drawn tight, plate 67 is displaced toward boss 30. The end of plate bore 68 facing boss 30 is formed with an internal chamber providing an inclined generally conical smooth face 81.

Referring to FIGURES 1 and 2, ring 41 is so located on tube 38 as to be axially disposed between boss 30 and plate 67 in the assembly. Ring 41 is formed around its outer periphery with an inclined generally conical face 82 corresponding to and opposite plate face 81, and with an inclined generally conical face 83 corresponding to and opposite body bore face 65.

During assembly of the embodiment shown in FIGURE 1, plate 67 is disposed on tube 38 outwardly of ring 41, before tube 38 is welded to casing 32, and the end of tube 38 is inserted into bore 27, the wedge assembly cartridge unit 45 being disposed in place with the end of rod 46 seated in diaphragm rod recess 43. Washer 52 is guided into bore 26 and seats non-rotatably on shoulder 29, and the wedge 47 and rollers 49 extend between the slotted inner ends of opposed plungers 12 and 14. Tube 38 is pushed inward axially until the flat end 40 of tube 38 firmly abuts actuator shoulder 28. Plate 67 is slipped over studs 74 and 75 and the nut and washer assemblies placed on the studs and drawn tight.

At this time the parts become disposed as shown in FIGURES 1 and 2, with the retainer plate bore face 81 abutting ring face 82 to hold the tube end in tight abutment with face 28. The other ring face 83 remains spaced from the actuator boss face 65, the spacing being indicated at 84. The dimensions of the parts are such that the wedge 47 and rollers 49 are now properly located in optimum initial position between the inner ends of plungers 12 and 14 with the diaphragm 33 bottomed in chamber 35 at its limit of stroke in brake disengaged direction. The plungers 12 and 14 at this time are both urged inwardly against the anchor surface by the usual brake shoe return springs (not shown).

It will be observed that once washer 52 has seated on shoulder 29 further axial inward movement of tube 38 compresses spring 54 and results in the wedge and its associated carrier and roller assembly being projected further into the space between the plungers and away from washer 52, whereby roller carrier 48, which in the cartridge was held against the wedge in relatively immovable condition by spring 54 and washer 52, is now free of washer 52 and is disposed in its operative floating condition on the wedge to function as described in said Letters Patent No. 3,037,584.

As shown in FIGURE 1 the plane of tube and face 40 may be accurately located a fixed distance A from the locating face 90 within the motor casing determining the brake retracted limit stroke of the wedge. Similarly, actuator body face 28 is accurately located a fixed distance B with respect to the plunger bore axis P—P. Thus, when face 40 of tube 38 abuts face 28, this establishes a known accurately predetermined axial distance between motor face 90 and the plunger axis P—P, and the internal components of the wedge actuator and motor are automatically located in correct axial relationship.

Under the foregoing conditions, it is now possible to grasp motor casing 31 and rotate it bodily about the axis W—W to position it anywhere within 360° for optimum clearance with the axle or for attachment of the fluid pressure lines. This rotation is permitted by the smooth frictional slide surfaces 28, 40 and 81, 82 and it does not change the preset axial position of the wedge assembly.

FIGURE 4 shows the invention according to a further embodiment. Here the accurately located faces for determining the position of the actuation components are ring face 83 and actuator body face 65. In this instance the longitudinal distance between internal motor face 90 and ring face 83 is accurately preset, and the body face 65 is formed an accurately known distance from the plunger axis P—P, so that when nuts 78 and 79 are drawn tight the retainer plate 67 engages ring 41 and forces ring face 83 into abutment with body face 65, and this properly locates the wedge assembly as in FIGURE 1 and permits the rotative positioning of the motor without disturbing the preset location of the actuation parts.

The difference between FIGURES 1 and 4 is that in FIGURE 1 the only faces that have to be accurately located are faces 28 and 40, whereas in FIGURE 4 the only faces to be acurately located are faces 65 and 83. The FIGURE 4 structure would be used where tube 38 is not long enough to bottom on the shoulder 28.

Figure 5:
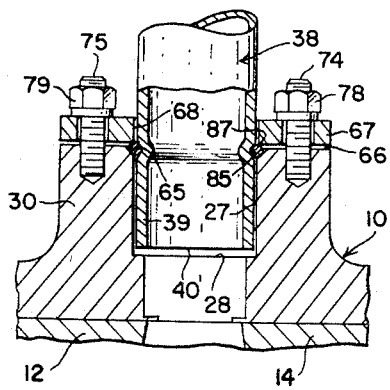
FIGURES 5 and 5a are fragmentary views mainly in section illustrating still other embodiments of the invention and respectively showing the motor support tube in the FIGURES 4 and 1 relationships.

FIGURE 5 shows a further embodiment like FIGURE 4, wherein the motor support tube 38 is formed with an annular external surface groove 85 within which is disposed a ring 86 of circular cross-section hard steel wire. In this embodiment plate 67, instead of being formed with a chamfer at the lower end of bore 68 is formed with a relatively sharp edge 87 around that end of the bore adapted to linearly engage ring 86 when the retainer plate nuts are drawn tight. Since the end 40 of tube 38 terminates short of shoulder 28, plate 67 forces ring 86 against the accurately located housing body face 65. By accurately locating groove 85 relative to internal face 90 of the motor, an assembly is provided which like FIGURE 4 properly locates the actuator components in accurate operative position while permitting motor 31 and tube 38 to be rotated about the axis W—W relative to the actuator body.

Figure 5A:
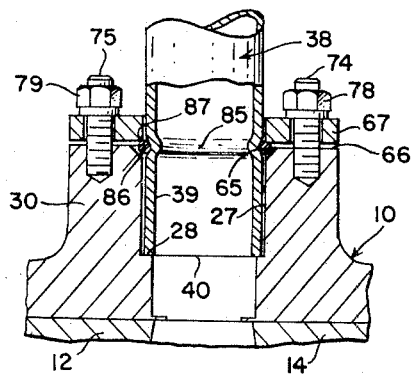

In FIGURE 5a the accurately located surfaces are motor tube end face 40 and body shoulder face 28, which abut when the tube 38 bottoms in bore 27 as in FIGURE 1. When nuts 78 and 79 are drawn tight, plate 67 engages ring 86 around a line at edge 87 and through groove 85 urges the tube 38 tightly into the body bore.

In both FIGURES 5 and 5a the groove recess 85 is integrally formed as an internal bead around tube 38 by suitable deformation of the wall of tube 38.

Figure 6:
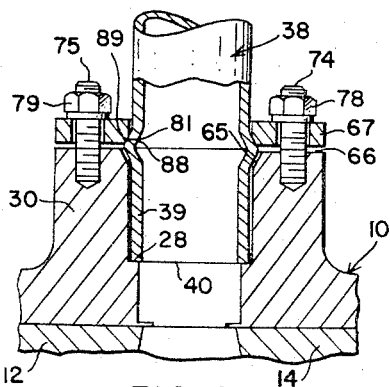
FIGURES 6 and 6a are fragmentary views mainly in section showing further embodiments and respectively showing the motor support tube in the FIGURE 1 and 4 relationships.

FIGURE 6 shows a further embodiment wherein an external bead 88 is formed integrally in the wall of tube 38 having an inclined conical face 89 adapted to abut the chamfered face 81 of plate 67, so that when nuts 78 and 79 are drawn tight the accurately located end face 40 of tube 38 abuts body face 28 of the actuator, similarly to FIGURE 1.

Figure 6A:
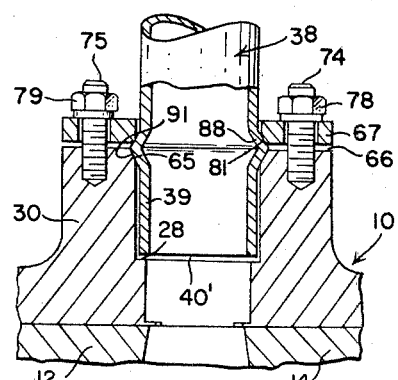

FIGURE 6a shows a construction related to FIGURE 6 but wherein the motor locating face is conical face 91 on bead 88 adapted to abut body face 65 when plate 67 is drawn tight, to locate the parts as in FIGURES 4 and 5. Here the accurately located faces are faces 91 and 65, and bead face 89 is engaged by the plate face 81 to urge the lower bead face 91 against actuator body face 65.

Figure 7:
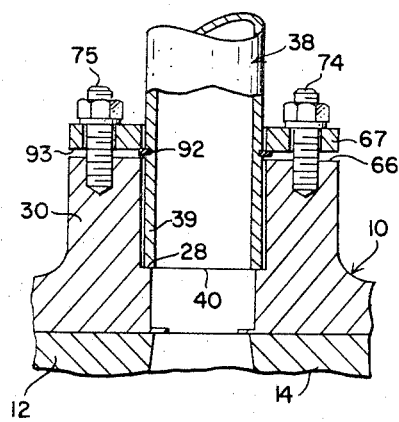
FIGURE 7 is a fragmentary view mainly in section illustrating still another embodiment of the invention.

FIGURE 7 illustrates an embodiment similar to FIGURES 1, 5a and 6 but wherein the motor support tube is annularly recessed to receive a flat sided snap ring 92 which serves, like ring 41 of FIGURE 1 for example, as a rigid motion transmitting member between plate 67 and tube 38. When nuts 78 and 79 are drawn tight the end face 40 of tube 38 abuts body shoulder 28, and this locates the internal actuator components as in the other embodiments. The flat underside 93 of plate 67 is in rotatable contact with flat ring 92.

In all of the foregoing embodiments the tubular support 38 may be rotated around axis W—W to any desired position without axially moving the tube with respect to housing 10 as would be the case with a threaded connection. The frictional surface contact at the accurately located surfaces of the tube and actuator body permits this relative rotation but maintains the rotated position.

The invention provides facilitation in manufacture and reduction of cost by eliminating the costly thread forming on the tubular support and the housing bore of prior assemblies. It is only necessary to provide a pair of co-operating sets of abutting accurately located faces in the motor mounting tube and the actuator housing. The locating formation on the motor support tube may be provided as in the disclosed embodiments in various structural arrangements without departing from the spirit of the invention.

The present invention may be embodied in other forms without departing from the spirit and essential characteristic in all respects as illustrative only and not restrictive, the scope of the invention being indicated by the appended claims rather than by the foregoing description.

We claim:

1. In a brake assembly of the type wherein a reciprocable wedge actuator projects into an actuator housing containing two oppositely slidable brake shoe associated plungers disposed in aligned bores having a common axis and a fluid pressure motor unit has a tubular support by which it is adapted to be mounted on said housing with said wedge actuator extending between a fluid pressure responsive element of said motor and the inner ends of said plungers, said housing having a bore into which said support extends, the improvement that comprises an axially outwardly facing abutment at said housing bore accurately located a predetermined distance from said plunger axis, a cooperating axially inwardly facing abutment on said support having an accurately predetermined location relative to a limit stroke position of said motor, and retainer means for forcing said motor unit and actuator housing together to engage and maintain engagement of said abutments while permitting rotation of the motor unit about its axis without changing the axial location of the parts determined by said abutments, said abutments comprising smooth faces within said bore and on said support respectively and said retainer means comprising axially fixed means on said support and a retainer member secured to said housing in rotatable engagement with said axially fixed means.

2. In the brake assembly defined in claim 1, said abutment faces being annular.

3. In the brake assembly defined in claim 1, said abutment faces being located at the bottom of said bore and the end of said support.

4. In the brake assembly defined in claim 1, said retainer means comprising an external annulus on said support and said retainer member having a bore freely surrounding the support with the inner end of said retainer member bore in rotatable engagement with said annulus.

5. In the brake assembly defined in claim 4, said annulus being a ring longitudinally fixed on said support.

6. In the brake assembly defined in claim 4, said annulus being an integral formation on said support.

7. In the brake assembly defined in claim 4, said annulus being a separate ring mounted in a peripheral groove on said support.

8. In the brake assembly defined in claim 5, said ring having a conical face in smooth rotative engagement with a corresponding smooth conical face at the inner end of said retainer member bore.

9. In the brake assembly defined in claim 8, said abutments being axially engaged smooth planar annular faces within the bore and in the associated end of said support respectively.

10. In the brake assembly defined in claim 8, said abutments being smooth axially engaged conical faces on said ring and the housing bore.

References Cited

UNITED STATES PATENTS 3,227,247  1/1966  Sherretts et al. _____ 188—79.5

FOREIGN PATENTS 981,257  1/1951  France.

FRED C. MATTERN, Jr., *Primary Examiner.*

F. D. SHOEMAKER, *Assistant Examiner.*

U.S. Cl. X.R.

188—152